(12) United States Patent
Delfino et al.

(10) Patent No.: US 11,733,851 B2
(45) Date of Patent: *Aug. 22, 2023

(54) GENERATION OF A COLOR OF AN OBJECT DISPLAYED ON A GUI

(71) Applicant: DASSAULT SYSTEMES, Velizy Villacoublay (FR)

(72) Inventors: Christophe Delfino, La Colle sur Loup (FR); Amal Plaudet-Hammani, Velizy Villacoublay (FR)

(73) Assignee: DASSAULT SYSTEMES, Velizy Villacoublay (FR)

( * ) Notice: Subject to any disclaimer, the term of this patent is extended or adjusted under 35 U.S.C. 154(b) by 0 days.

This patent is subject to a terminal disclaimer.

(21) Appl. No.: 17/743,635

(22) Filed: May 13, 2022

(65) Prior Publication Data

US 2022/0269402 A1 Aug. 25, 2022

Related U.S. Application Data

(63) Continuation of application No. 15/637,100, filed on Jun. 29, 2017, now Pat. No. 11,334,233.

(30) Foreign Application Priority Data

Jun. 29, 2016 (EP) ..................... 16305798

(51) Int. Cl.
*G06F 3/0484* (2022.01)
*G06F 3/0481* (2022.01)
(Continued)

(52) U.S. Cl.
CPC ...... *G06F 3/04847* (2013.01); *G06F 3/04817* (2013.01); *G06F 3/04883* (2013.01);
(Continued)

(58) Field of Classification Search
CPC ............ G06F 3/04847; G06F 3/04817; G06F 3/04883; G06F 30/00; G06F 3/04842;
(Continued)

(56) References Cited

U.S. PATENT DOCUMENTS

2009/0231356 A1* 9/2009 Barnes ............... G06Q 30/0275
715/781
2011/0074807 A1 3/2011 Inada et al.
(Continued)

FOREIGN PATENT DOCUMENTS

JP 2011-209929 A 10/2011
WO WO 2013/133905 A1 9/2013

OTHER PUBLICATIONS

Office Action dated Jan. 2, 2017, in Europe Patent Application No. 16305798.7-1972.
(Continued)

*Primary Examiner* — Cesar B Paula
*Assistant Examiner* — Zelalem Shalu
(74) *Attorney, Agent, or Firm* — Oblon, McClelland, Maier & Neustadt, L.L.P.

(57) ABSTRACT

A computer-implemented method for generating a color of an object displayed on a GUI. The method includes displaying on a graphical user interface a set of icons, each icon of the set being associated with a color, detecting a first user interaction on a first icon of the set, detecting a second user interaction that comprises at least a slide, modifying a value of a parameter of a first color associated with the first icon, the modification of the value being performed with the second user interaction, and computing a first new color that is the first color with the modified value of a parameter.

20 Claims, 9 Drawing Sheets

(51) Int. Cl.
*G06F 3/0488* (2022.01)
*G06F 3/04847* (2022.01)
*G06F 30/00* (2020.01)
*G06F 3/04817* (2022.01)
*G06F 3/04883* (2022.01)
*G06T 11/00* (2006.01)
*G06F 119/18* (2020.01)
*G06F 3/04842* (2022.01)

(52) U.S. Cl.
CPC ............ *G06F 30/00* (2020.01); *G06T 11/001* (2013.01); *G06F 3/04842* (2013.01); *G06F 2119/18* (2020.01); *G06T 2200/24* (2013.01)

(58) Field of Classification Search
CPC ............... G06F 2119/18; G06T 11/001; G06T 2200/24; Y02P 90/30
See application file for complete search history.

(56) References Cited

U.S. PATENT DOCUMENTS

| | | | |
|---|---|---|---|
| 2011/0292069 A1* | 12/2011 | Witt | G09G 5/02 345/590 |
| 2013/0106899 A1* | 5/2013 | Bhatt | G09G 5/02 345/593 |
| 2013/0132905 A1* | 5/2013 | Moskalonek | G06F 3/04845 715/835 |
| 2013/0239057 A1 | 9/2013 | Ubillos et al. | |
| 2013/0326381 A1 | 12/2013 | Pereira et al. | |
| 2014/0111539 A1* | 4/2014 | Allen | G06F 3/0488 345/594 |
| 2015/0277685 A1 | 10/2015 | Shieh et al. | |
| 2016/0154579 A1 | 6/2016 | Lee et al. | |
| 2017/0134663 A1 | 5/2017 | Jin et al. | |

OTHER PUBLICATIONS

Japanese Office Action dated Apr. 6, 2021 in Japanese Patent Application No. 2017-125154 (with English translation).

* cited by examiner

| 1st UI on a 1st icon associated with a 1st color | 2nd UI (User Interaction) | 3rd UI on a 2nd icon associated with a 2nd color | 4th UI | New color computed |
|---|---|---|---|---|
| tap | | | | Color of the icon |
| touch | slide | | | Modified color of the 1st icon |
| touch | | tap (the 1st UA being maintained) | | Merge of the colors of the 1st and 2nd icons |
| touch | | touch (the 1st UA being maintained or can be released once t2 has elapsed) | slide | Merge of the colors of the 1st icons with the modified color of the 2nd icons |
| touch | slide | tap (the 1st UA being maintained) | | Merge of the modified color of the 1st icon and the color of the 2nd icon |
| touch | slide | touch (the 1st UA being maintained or can be released once t2 has elapsed) | slide | Merge of the modified colors of the 1st and 2nd icon |

FIG. 15

GENERATION OF A COLOR OF AN OBJECT DISPLAYED ON A GUI

CROSS-REFERENCE TO RELATED APPLICATIONS

This application is a continuation of and claims priority to U.S. patent application Ser. No. 15/637,100, filed Jun. 29, 2017, which claims priority under 35 U.S.C. § 119 or 365 to European Application No. 16305798.7, filed Jun. 29, 2016. The entire contents of the above applications are incorporated herein by reference.

FIELD OF THE INVENTION

The invention relates to the field of computer programs and systems, and more specifically to a method, system and program for generating a color of an object displayed on a graphical user interface.

BACKGROUND

A number of systems and programs are offered on the market for the design, the engineering and the manufacturing of objects. CAD is an acronym for Computer-Aided Design, e.g. it relates to software solutions for designing an object. CAE is an acronym for Computer-Aided Engineering, e.g. it relates to software solutions for simulating the physical behaviour of a future product. CAM is an acronym for Computer-Aided Manufacturing, e.g. it relates to software solutions for defining manufacturing processes and operations. In such computer-aided design systems, the graphical user interface plays an important role as regards the efficiency of the technique. These techniques may be embedded within Product Lifecycle Management (PLM) systems. PLM refers to a business strategy that helps companies to share product data, apply common processes, and leverage corporate knowledge for the development of products from conception to the end of their life, across the concept of extended enterprise. The PLM solutions provided by Dassault Systémes (under the trademarks CATIA, ENOVIA and DELMIA) provide an Engineering Hub, which organizes product engineering knowledge, a Manufacturing Hub, which manages manufacturing engineering knowledge, and an Enterprise Hub which enables enterprise integrations and connections into both the Engineering and Manufacturing Hubs. All together the system delivers an open object model linking products, processes, resources to enable dynamic, knowledge-based product creation and decision support that drives optimized product definition, manufacturing preparation, production and service.

Software such as graphic editors, modeled object editors, provide the user with a color picker that is also referred to as color chooser. A color picker contains graphical tools such as buttons, sliders, entry fields for modifying color properties, and therefore for modifying a color. These color pickers can be accessed thanks to a separated panel, or a contextual menu, that appears after an action on the button.

However, the known color pickers suffer several drawbacks. First, the number of user interactions required for configuring and obtaining the right color can be important, notably when customizing the parameters. Reducing the number of interactions for configuring a color is critical in touch-sensitive environments, e.g. on the touch-sensitive screen of a tablet. Second, the known color pickers use a non-negligible space on the graphical user interface, and thus on the screen, due to the multiple commands display. In general, touch-sensitive devices have a display with a limited size, e.g. a tablet. Furthermore, the manipulations for using the commands are not adapted to touch-sensitive environments, and many input errors may occur when configuring parameters of a color. The user has to trigger several time a same command for performing all the adjustment of all the parameters.

Within this context, there is still a need for improving the configuration of a color of an object displayed on a graphical user interface.

SUMMARY OF THE INVENTION

It is therefore provided a computer-implemented method for generating a color of an object displayed on a graphical user interface. The method comprises:
- displaying on a graphical user interface a set of icons, each icon of the set being associated with a color;
- detecting a first user interaction on a first icon of the set;
- detecting a second user interaction that comprises at least a slide;
- modifying a value of a parameter of a first color associated with the first icon, the modification of the value being performed with the second user interaction;
- computing a first new color that is the first color with the modified value of a parameter.

The method may comprise one or more of the following:
- detecting a third user interaction on a second icon of the set associated with a second color; computing a second new color by merging the first new color and the second color;
- before computing the second new color: detecting a fourth user interaction that comprises at least a slide; modifying a value of a parameter of the second color, the selection of the value is performed with the second user interaction;
- the second user interaction comprises a touch and a slide that starts from the touch, the slide having a orientation that is substantially horizontal;
- the second user interaction comprises a touch and a slide starting from the touch, the slide having an orientation that is substantially vertical;
- one orientation of the slide is associated with one parameter of the first color;
- detecting a first user interaction on a first icon of the set comprises detecting a first user touch on a first icon of the set, determining that the duration of first user touch exceeds a predetermined time period, detecting that the first user touch is ended, selecting the first color associated with the first icon when the end of the first user touch is detected;
- selecting an object displayed on the graphical user interface before displaying the set of icons, detecting a fifth user interaction after the new color has been computed, applying the new color on the select object;
- computing a new color is performed in real-time while the second user interaction is detected, and further comprising rendering the first icon of the set with the computed new color computed in real-time; and/or rendering a third icon with the computed new color.

It is further provided a computer program comprising instructions for performing the method.

It is further provided a computer readable storage medium having recorded thereon the computer program.

It is further provided a system comprising a processor coupled to a memory and a graphical user interface, the memory having recorded thereon the computer program.

BRIEF DESCRIPTION OF THE DRAWINGS

Embodiments of the invention will now be described, by way of non-limiting example, and in reference to the accompanying drawings, where:

FIG. 15 shows examples of combinations of user interaction (UI) for performing the invention.

DETAILED DESCRIPTION OF THE INVENTION

Figure 1:
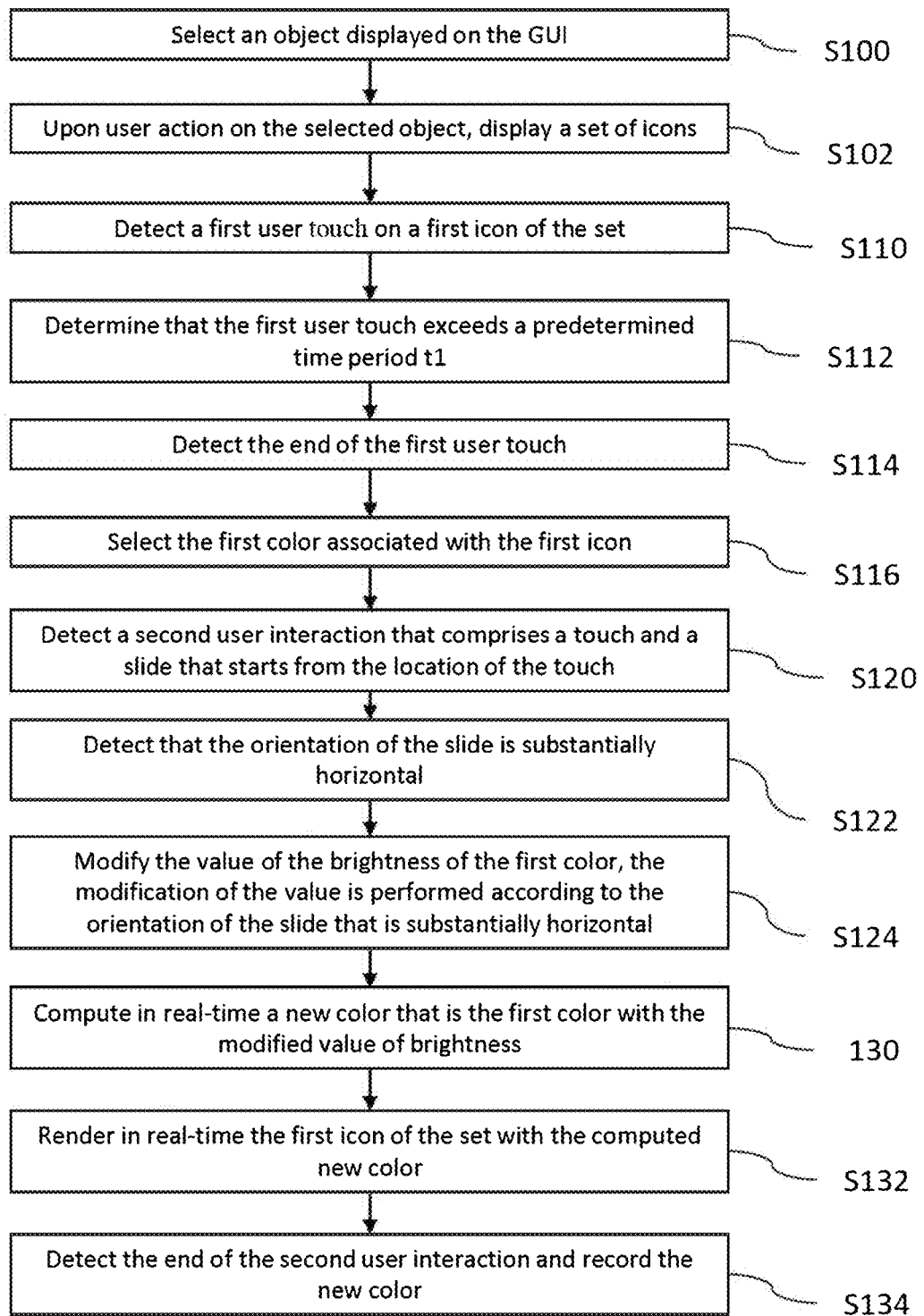
FIG. 1 shows the first part of a flowchart of an example of the method.
Figure 2:
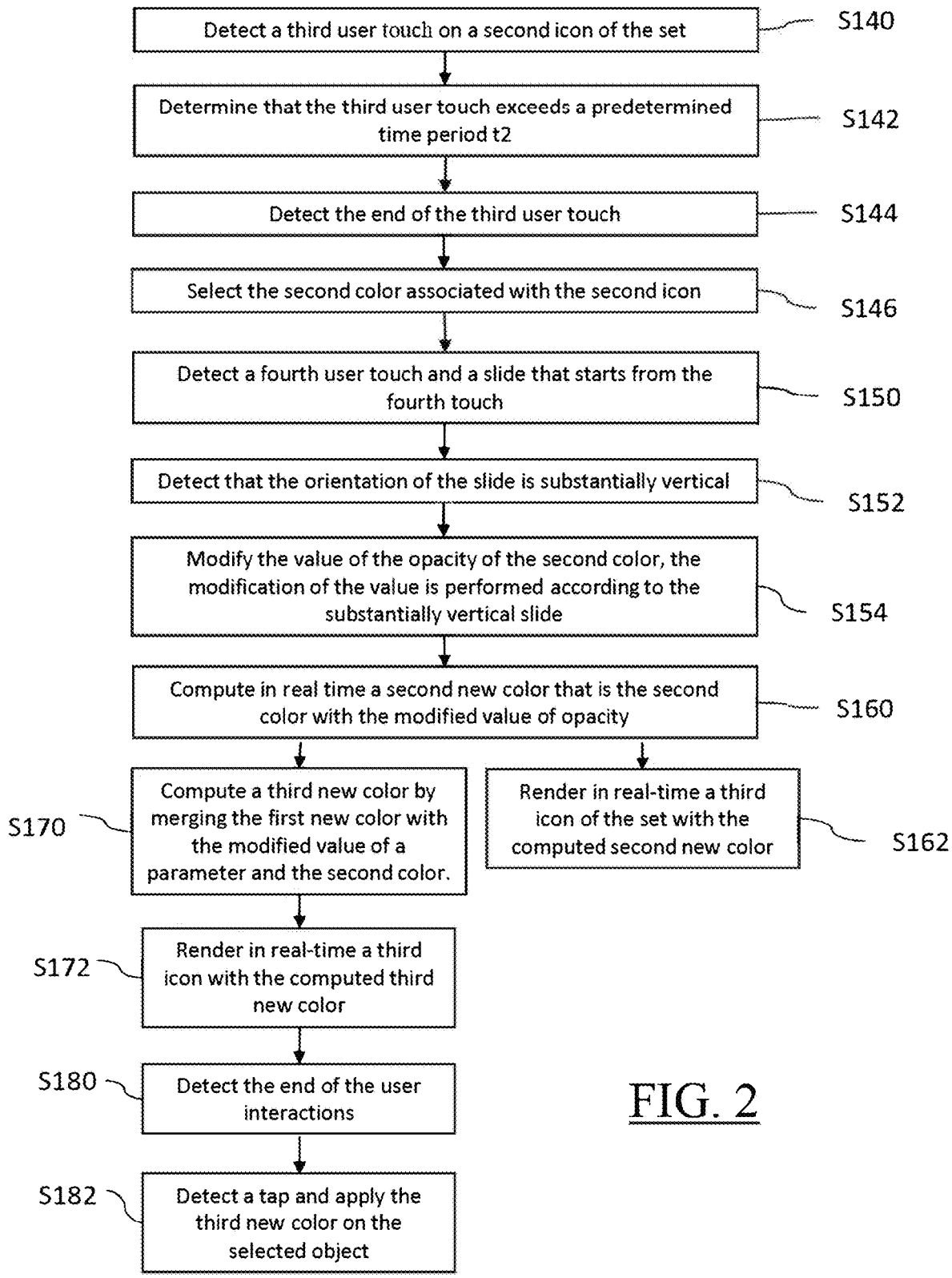
FIG. 2 shows the second part of a flowchart of the same example of FIG. 1.

With reference to the flowcharts of FIGS. 1 and 2, it is proposed a computer-implemented method for generating a color of an object displayed on a graphical user interface. Such a method improves the configuration of a colour on a touch sensitive display or at least with a touch sensitive haptic device.

Notably, the invention makes easier the modification of the color properties on a dimensional geometry on a 3D modeled object, or on 2D object, and more generally on any object displayed by a computer program such as a CAD system, a graphics editor program. This invention allows the user to customize the color properties in one hold, e.g. without lifting the finger from a touch-sensitive display. Thus the user can modify color, brightness and opacity in a same action. The user can also merge different colors in order to obtain a new hybrid color.

The method is computer-implemented. This means that the steps (or substantially all the steps) of the method are executed by at least one computer, or any system alike. Thus, steps of the method are performed by the computer, possibly fully automatically, or, semi-automatically. In examples, the triggering of at least some of the steps of the method may be performed through user-computer interaction. The level of user-computer interaction required may depend on the level of automatism foreseen and put in balance with the need to implement user's wishes. In examples, this level may be user-defined and/or pre-defined.

For instance, the modification of a value of a parameter of a color is performed with a user interaction that may be a touch comprising a slide; the user may touch a touch-sensitive display with one of their finger and then slide the finger from the location of the touch in order to modify the parameter value. Touch, tap, and slide are examples of user interactions a user can carry out for performing the method of the invention.

A typical example of computer-implementation of the method is to perform the method with a system adapted for this purpose. The system may comprise a processor coupled to a memory and a graphical user interface (GUI), the memory having recorded thereon a computer program comprising instructions for performing the method. The memory may also store a database. The memory is any hardware adapted for such storage, possibly comprising several physical distinct parts (e.g. one for the program, and possibly one for the database). The system also provides a touch sensitive haptic device that may be, but is not limited to, a touch sensitive screen, a pen display, a pen tablet. The touch sensitive screen or the pen display can display the graphical user interface.

The generated color can be applied on an object that may be, but is not limited to, a 2D object, a 3D object (the 2D or 3D object can be a modeled object), a picture. More generally, the generated color can be applied on any kind of object that is rendered or displayed on a graphical user interface. Applying the generated color means that the rendering of an object is modified: the object (or at least a part of the object) is rendered with the generated color.

The object to color can be stored on a database. By "database", it is meant any collection of data (i.e. information) organized for search and retrieval (e.g. a relational database, e.g. based on a predetermined structured language, e.g. SQL). When stored on a memory, the database allows a rapid search and retrieval by a computer. Databases are indeed structured to facilitate storage, retrieval, modification, and deletion of data in conjunction with various data-processing operations. The database may consist of a file or set of files that can be broken down into records, each of which consists of one or more fields. Fields are the basic units of data storage. Users may retrieve data primarily through queries. Using keywords and sorting commands, users can rapidly search, rearrange, group, and select the field in many records to retrieve or create reports on particular aggregates of data according to the rules of the database management system being used.

The method generally manipulates objects. An object is defined by data stored e.g. in the database. By extension, the term "object" designates the data itself. According to the type of the system, the objects may be defined by different kinds of data. The system may indeed be any combination of a CAD system, a CAE system, a CAM system, a PDM system and/or a PLM system. The system may execute any application suitable for rendering an object, such as a graphic editor.

In those different systems, objects are defined by corresponding data. One may for instance speak of CAD object and CAD data for a CAD system, image object and image data for a picture editor. However, these systems are not exclusive one of the other, as a modeled object may be defined by data corresponding to any combination of these systems.

By CAD system, it is additionally meant any system adapted at least for designing a modeled object on the basis of a graphical representation of the modeled object, such as CATIA. In this case, the data defining a modeled object comprise data allowing the representation of the modeled object. A CAD system may for example provide a representation of CAD modeled objects using edges or lines, in certain cases with faces or surfaces. Lines, edges, or surfaces may be represented in various manners, e.g. non-uniform rational B-splines (NURBS). Specifically, a CAD file contains specifications, from which geometry may be generated, which in turn allows for a representation to be generated. Specifications of a modeled object may be stored in a single CAD file or multiple ones. The typical size of a file representing a modeled object in a CAD system is in the range of one Megabyte per part. And a modeled object may typically be an assembly of thousands of parts.

In the context of CAD, an object may typically be a modeled object, or even a 3D modeled object, e.g. representing a product such as a part or an assembly of parts, or possibly an assembly of products. By "3D modeled object", it is meant any object which is modeled by data allowing its 3D representation. A 3D representation allows the viewing of the part from all angles. For example, a 3D modeled object, when 3D represented, may be handled and turned around any of its axes, or around any axis in the screen on which the representation is displayed. This notably excludes 2D icons, which are not 3D modeled. The display of a 3D representation facilitates design (i.e. increases the speed at which designers statistically accomplish their task). This speeds up the manufacturing process in the industry, as the design of the products is part of the manufacturing process.

The 3D modeled object may represent the geometry of a product to be manufactured in the real world subsequent to the completion of its virtual design with for instance a CAD software solution or CAD system, such as a (e.g. mechanical) part or assembly of parts (or equivalently an assembly of parts, as the assembly of parts may be seen as a part itself from the point of view of the method, or the method may be applied independently to each part of the assembly), or more generally any rigid body assembly (e.g. a mobile mechanism). A CAD software solution allows the design of products in various and unlimited industrial fields, including: aerospace, architecture, construction, consumer goods, high-tech devices, industrial equipment, transportation, marine, and/or offshore oil/gas production or transportation. The 3D modeled object designed by the method may thus represent an industrial product which may be any mechanical part, such as a part of a terrestrial vehicle (including e.g. car and light truck equipment, racing cars, motorcycles, truck and motor equipment, trucks and buses, trains), a part of an aerial vehicle (including e.g. airframe equipment, aerospace equipment, propulsion equipment, defense products, airline equipment, space equipment), a part of a naval vehicle (including e.g. navy equipment, commercial ships, offshore equipment, yachts and workboats, marine equipment), a general mechanical part (including e.g. industrial manufacturing machinery, heavy mobile machinery or equipment, installed equipment, industrial equipment product, fabricated metal product, tire manufacturing product), an electro-mechanical or electronic part (including e.g. consumer electronics, security and/or control and/or instrumentation products, computing and communication equipment, semiconductors, medical devices and equipment), a consumer good (including e.g. furniture, home and garden products, leisure goods, fashion products, hard goods retailers' products, soft goods retailers' products), a packaging (including e.g. food and beverage and tobacco, beauty and personal care, household product packaging).

By PLM system, it is additionally meant any system adapted for the management of a modeled object representing a physical manufactured product (or product to be manufactured). In a PLM system, a modeled object is thus defined by data suitable for the manufacturing of a physical object. These may typically be dimension values and/or tolerance values. For a correct manufacturing of an object, it is indeed better to have such values.

By CAM solution, it is additionally meant any solution, software of hardware, adapted for managing the manufacturing data of a product. The manufacturing data generally includes data related to the product to manufacture, the manufacturing process and the required resources. A CAM solution is used to plan and optimize the whole manufacturing process of a product. For instance, it can provide the CAM users with information on the feasibility, the duration of a manufacturing process or the number of resources, such as specific robots, that may be used at a specific step of the manufacturing process; and thus allowing decision on management or required investment. CAM is a subsequent process after a CAD process and potential CAE process. Such CAM solutions are provided by Dassault Systémes under the trademark DELMIA®.

By CAE solution, it is additionally meant any solution, software of hardware, adapted for the analysis of the physical behavior of modeled object. A well-known and widely used CAE technique is the Finite Element Method (FEM) which typically involves a division of a modeled objet into elements which physical behaviors can be computed and simulated through equations. Such CAE solutions are provided by Dassault Systémes under the trademark SIMULIA®. Another growing CAE technique involves the modeling and analysis of complex systems composed of a plurality components from different fields of physics without CAD geometry data. CAE solutions allow the simulation and thus the optimization, the improvement and the validation of products to manufacture. Such CAE solutions are provided by Dassault Systémes under the trademark DYMOLA®.

PDM stands for Product Data Management. By PDM solution, it is meant any solution, software of hardware, adapted for managing all types of data related to a particular product. A PDM solution may be used by all actors involved in the lifecycle of a product: primarily engineers but also including project managers, finance people, sales people and buyers. A PDM solution is generally based on a product-oriented database. It allows the actors to share consistent data on their products and therefore prevents actors from using divergent data. Such PDM solutions are provided by Dassault Systémes under the trademark ENOVIA®.

Figure 13:
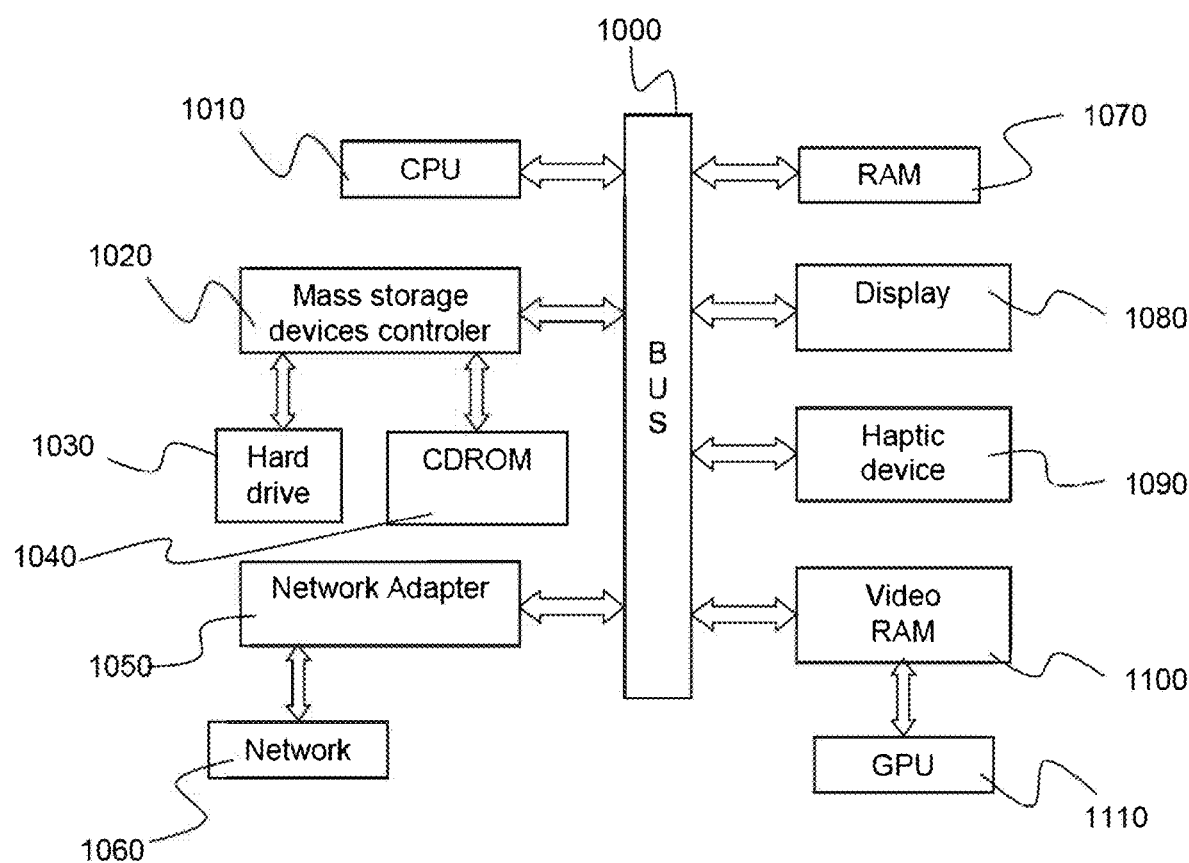
FIG. 13 shows an example of a system for performing the invention.

FIG. 13 shows an example of a system for performing the invention, wherein the system is a client computer system, e.g. a workstation of a user.

The client computer of the example comprises a central processing unit (CPU) 1010 connected to an internal communication BUS 1000, a random access memory (RAM) 1070 also connected to the BUS. The client computer is further provided with a graphical processing unit (GPU) 1110 which is associated with a video random access memory 1100 connected to the BUS. Video RAM 1100 is also known in the art as frame buffer. A mass storage device controller 1020 manages accesses to a mass memory device, such as hard drive 1030. Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks 1040. Any of the foregoing may be supplemented by, or incorporated in, specially designed ASICs (application-specific integrated circuits). A network adapter 1050 manages accesses to a network 1060. The client computer may also include a haptic device 1090 such as cursor control device, a keyboard or the like. A cursor control device is used in the client computer to permit the user to selectively position a cursor at any desired location on display 1080. In addition, the cursor control device allows the user to select various commands, and input control signals. The cursor control device includes a number of signal generation devices for input control signals to system. Typically, a cursor control device may be a mouse, the button of the mouse being used to generate the signals. Alternatively or additionally, the client computer system may comprise a sensitive pad, and/or a touch sensitive display. The sensitive pad (e.g. a graphic tablet) and the touch sensitive display (e.g. a touch screen) provide a haptic device for interacting with the computer system.

The computer program may comprise instructions executable by a computer, the instructions comprising means for causing the above system to perform the method. The program may be recordable on any data storage medium, including the memory of the system. The program may for example be implemented in digital electronic circuitry, or in computer hardware, firmware, software, or in combinations of them. The program may be implemented as an apparatus, for example a product tangibly embodied in a machine-readable storage device for execution by a programmable processor. Method steps may be performed by a programmable processor executing a program of instructions to perform functions of the method by operating on input data and generating output. The processor may thus be programmable and coupled to receive data and instructions from, and to transmit data and instructions to, a data storage system, at least one input device, and at least one output device. The application program may be implemented in a high-level procedural or object-oriented programming language, or in assembly or machine language if desired. In any case, the language may be a compiled or interpreted language. The program may be a full installation program or an update program. Application of the program on the system results in any case in instructions for performing the method.

Referring back to FIGS. 1 and 2, it is discussed an example of the method. The FIGS. 3 to 11 show representations of a graphical tool for generating a color with the method as well as representations of examples of user interactions performed with the method.

At step S100, an object is selected on a graphical user interface (GUI); the object to be selected is displayed on the GUI. The display of the object is the result of a rendering. Rendering is the process of generating an image from a data of two-dimensional (2D) or three-dimensional (3D) model (or models in what collectively could be called a scene file) by means of a computer program. The object are any data that can be displayed. For instance, an image is an object, and an image display on a GUI may be selected by a user.

The GUI is displayed to the user by the computer system executing the method. A GUI is an interface that allows users to interact with a computer system. The GUI may show various types of graphic tools; for example, the GUI of a CAD system may comprise graphic tools for facilitating 3D orientation of the object, for triggering a simulation of an operation of an edited product or rendering various attributes of the displayed product. A cursor is in general used to interact with the GUI, e.g. the cursor of the haptic device 1090. The interactions can be performed directly on a touch sensitive display that displays the GUI, e.g. an appendage such as user finger(s) or a stylus are typically used for interacting with the GUI. It is to be understood that the present invention can be carried out on any kind of GUI accepting user inputs or user interactions.

Figure 14:
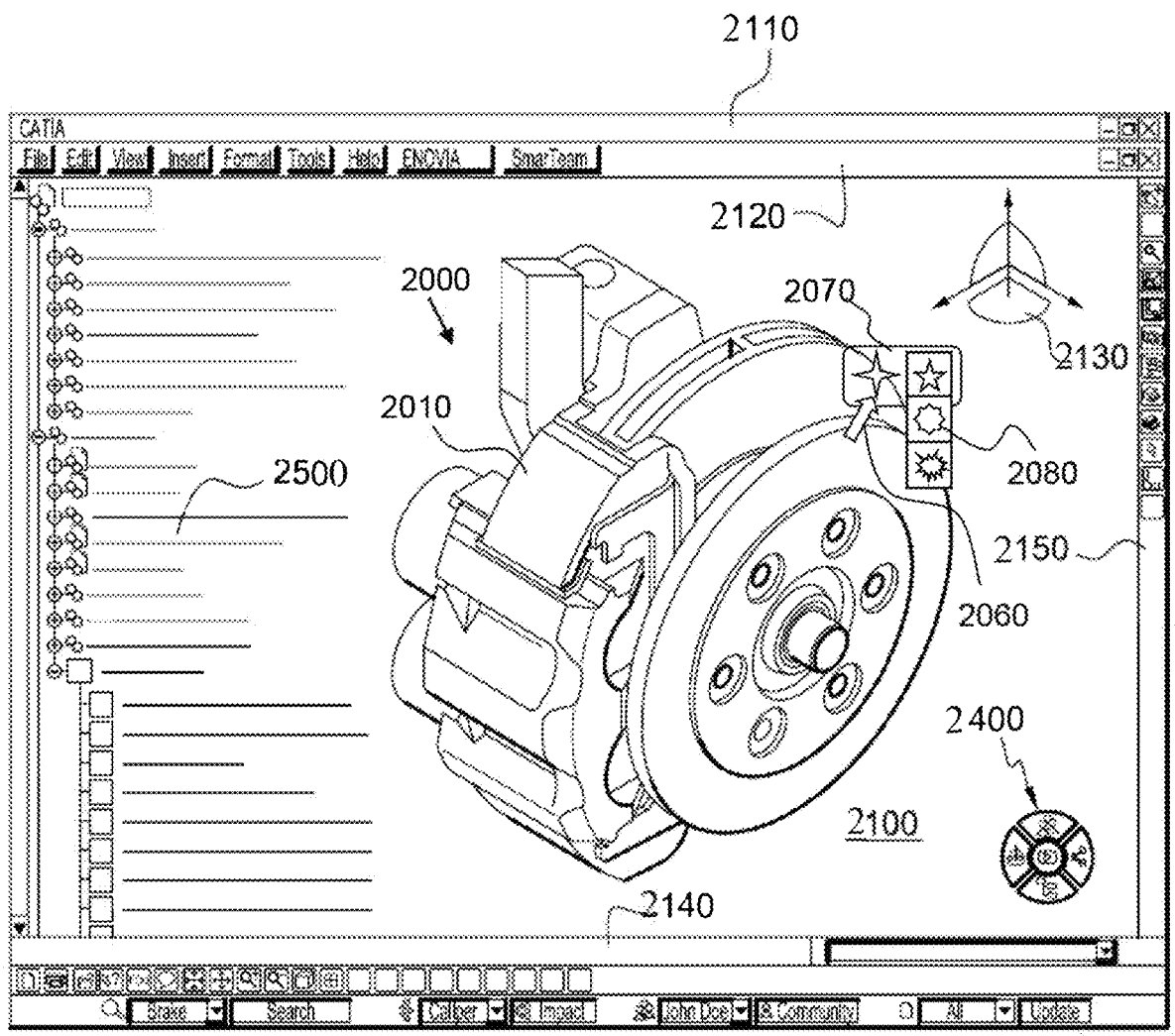
FIG. 14 shows an example of a graphical user interface.

FIG. 14 shows an example a typical CAD-like interface, having standard menu bars 2110, 2120, as well as bottom and side toolbars 2140, 2150. Such menu- and toolbars contain a set of user-selectable icons, each icon being associated with one or more operations or functions, as known in the art. Some of these icons are associated with software tools, adapted for editing and/or working on the 3D modeled object 2000 displayed in the GUI 2100. The software tools may be grouped into workbenches. Each workbench comprises a subset of software tools. In particular, one of the workbenches is an edition workbench, suitable for editing geometrical features of the modeled product 2000. In operation, a designer may for example pre-select a part of the object 2000 and then initiate an operation (e.g. change the dimension, color, etc.) or edit geometrical constraints by selecting an appropriate icon. For example, typical CAD operations are the modeling of the punching or the folding of the 3D modeled object displayed on the screen. The GUI may for example display data 2500 related to the displayed product 2000. In the example of FIG. 14, the data 2500, displayed as a "feature tree", and their 3D representation 2000 pertain to a brake assembly including brake caliper and disc. The GUI may further show various types of graphic tools 2130, 2070, 2080 for example for facilitating 3D orientation of the object, for triggering a simulation of an operation of an edited product or render various attributes of the displayed product 2000. A cursor 2060 may be controlled by a haptic device to allow the user to interact with the graphic tools.

The selection of the object is carried out as known in the art. For instance, the user performs a tap on the displayed object. Said otherwise, the user uses an appendage such as, but is not limited to, a finger or a stylet, for creating an interaction with the graphical representation of the object; the interaction is made through a touch sensitive display and interpreted by the system as a selection of the object displayed.

Then, at step S102, a set of icons is displayed as a result of the selection of the object. For instance, a tap on the object at step S100 may be interpreted by the system as a command for selecting the object and for displaying the set of icons at the same time.

Figure 3:
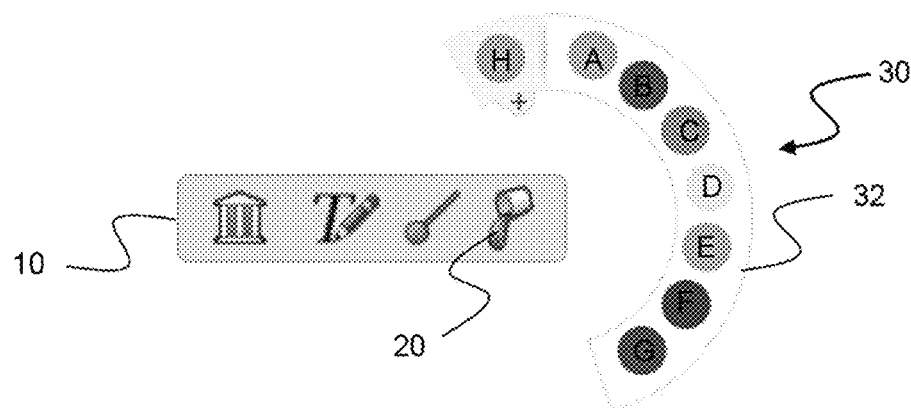
FIGS. 3, 4, 5, 6, 7, 8, 9 and 10 show illustrations of user actions of the example of FIGS. 1 to 2.

FIG. 3 shows an example of a set of icons 30 that are displayed. The icons are 2D disks, being understood that icons are not limited to disk shapes. The icons may be also 3D icons, e.g. they are 3D objects displayed in a 3D scene. The icons may be also 2D icons represented with a perspective view in order to mimic a 3D representation.

The icons 30 are placed on a 2D portion of a circular crown 32 that is also displayed on the GUI. The portion of a circular crown may be also a 3D object. The portion of a circular crown may be a 2D object represented with a perspective view in order to mimic a 3D representation. The 2D portion of the circular crown 32 may be contemplated as a layout on which the icons are laid on, being understood that the object 32 is not limited to this particular shape.

In the example of FIG. 3, the set of icons 30 and the portion 32 of the circular crown are displayed all at the same time after a user selection on the icon 20 of a toolbar 10 occurred. For instance, the user puts they finger on the icon 20. The toolbar 10 is displayed as a result of the selection of an object, for instance at step S100. Thus, the user selection of an object at step S100 can trigger the display of the toolbar 10, which in turn allows a user's selection of a color configuration mode, e.g. by performing a tap on the button 20.

The icons of the set 30 may be substantially placed equidistant from a first location in the GUI. This first location is typically defined from a user interaction with the GUI, e.g. the user selection of the icon 20.

The 2D representations of the objects 10, 20, 30 may be displayed in a 3D scene. The 2D objects 10, 20, 30 are over the view of the 3D scene, that is, they are displayed on a 2D plan wherein the scene and the objects are projected for display purpose.

Each icon of the set is associated with a color. The term association means that there is a logical link between the icon and a color; or said otherwise, a user interaction on an icon of the set is likely to trigger an operation involving the color with which the icon is associated. For instance, the icon A of FIG. 3 is associated with the color grey; the icon D is associated with the color yellow. In FIG. 3, each icon of the set (the seven icons A to G) is associated with one color that is unique among the colors of the other icons; being understood that two or more icons might be associated with a same color. Still in FIG. 3, each icon is rendered with the color with which it is associated; for example, the icon A is rendered as a grey disk, the icon D as yellow disk.

Back to the flowchart of FIG. 1, at step S110, a first user interaction is detected on a first icon of the set. The user interaction can be made the same way as already discussed in reference to step S100. The user interaction may be a touch, that is, the user puts an appendage on the icon during a time period t. Said otherwise, a contact between the appendage and the touch screen is maintained during t.

Figures 4, 5:
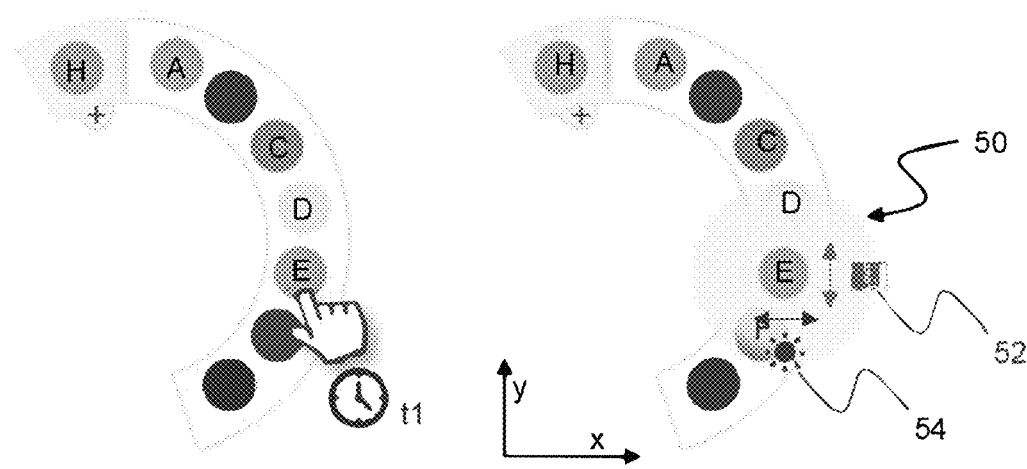

FIG. 4 illustrates an example of step S110: the user touches with their finger the icon E associated with the color green. The first user interaction can be carried out only on the graphical representation of the icon, that is, the location of the user interaction belongs to the area defined by the icon. The first user interaction may be also performed on a zone of the GUI that extends the area of the icon: the user interactions performed on this zone are interpreted as having being made on the area defined by the icon.

At step S112, it is determined whether or not the duration of the first user interaction on the icon of the set is equal to or exceeds a predetermined time period t1.

If the duration of the first user interaction is equal to or exceeds t1, the user interaction is a touch and the first color that is associated with the touched icon is selected (S116). The selection S116 of the first color means that the first color can be used in subsequent steps that require a color, e.g. the parameters defining the selected first color are stored on memory for the purpose of a next use.

If the duration of the first user interaction is lower than t1, the user interaction is a tap and the first color that is associated with the taped icon is applied on the object selected at step S100. Applying the color means that the rendering of the selected object is modified according to the color associated with the first icon. For instance, the selected object may be (partially or totally) colored with this color.

Hence, when the user performs a touch (the duration of the first user interaction is equal to or exceeds t1), a color selection occurs. And when the user performs a tap (the duration of the first user interaction is lower than t1), a color is applied on a formerly selected object.

The system performing the method may provide a signal to the user indicating that the time period t1 elapsed. For examples, the rendering of the icon may be modified, or the system may send a vibration of the user through the appendage, or a sound may be emitted by the system . . . .

The selection of the first color may be carried out after that the detection (S114) of the end of the first user touch is ended. This allows the user providing a confirmation to the system that they agree with the color to be selected.

FIG. 5 shows an example of the representation of the set of icons after that the selection of the color associated with the icon E is effective. In this example, a blurred zone 50 surrounds the icon E for providing a visual indication of the selection of the color green associated with the icon E.

Still in reference to FIG. 5, two new visual indicators 52, 54 are also displayed together with the blurred zone 50. In this example, the representations are displayed in the close neighborhood of the icon E; they are represented on the blurred zone. The purpose of these two representations is indicated to the user the new user interactions they can perform.

Back to FIG. 1, at step S120, a second user interaction is detected. The second user interaction comprises at least a slide. The term slide means a displacement of a user interaction from a first location on the touch sensitive display to a second one. For instance, the user puts one of their fingers on the touch sensitive display and displaces it on the touch sensitive display—the finger is continuously in contact with the touch sensitive display and the system does not detect an end of the second user interaction between the first and second location on the GUI—. In the example of FIG. 1, the second user interaction comprises a touch and a slide: the slide starts from the location on the touch sensitive display of the touch and the duration of the second user interaction is equal to or exceeds a predetermined duration.

The second user interaction may be performed with the same appendage as the first one, or with a different one. For instance, the user can performed the second user interaction with the same finger used for selecting a color. Any combination of appendages may be contemplated.

At step S122, an orientation of the slide of the second user interaction on the GUI is detected. The orientation of the slide of the second user interaction is determined by the relative position of the first location of the slide on the GUI with the second location of the slide on the GUI. The detection of the orientation of the slide may further comprise the detection of the direction of the slide, as explained below.

Interestingly, the second user interaction may be in the continuity of the first one; the second user interaction starts without the end of the first one is detected. In this case, the selection of step S116 is immediately carried out after the step S112 (that is, without the detection of step S114). For instance, the user puts a finger on the first icon at a first location in order to select a color (this is, the first user interaction is a touch), and when the color is selected, the user slides their finger from the first location (which is the location of the touch) to a second one; the slide is therefore the second user interaction.

Next, at step S124, a value of a parameter of the first color associated with the first icon is modified. The parameter of a color can comprise, but is not limited to, any color appearance parameters such opacity, hue, lightness, brightness, chroma, colorfulness, saturation. The value of a parameter is modified, and the modification is performed according to the slide of the second user interaction.

A given orientation of the slide allows selecting a color parameter and modifying a value of this particular parameter. For instance, a slide with a substantially horizontal orientation will trigger the selection of the parameter brightness of the selected color (the first color at step S122). As another example, a slide with a substantially vertical orientation will select the parameter opacity of the selected color. Further orientations of slide may be contemplated and one understands that any parameter may be associated with any slide orientation. The orientation of the slide of a user interaction is determined with reference to a frame of reference (x, y), e.g. the frame of reference of the GUI, the frame of reference of a portable device (smartphone, tablet) that implements the invention.

The determination of the orientation of the slide may further comprise the detection of the direction of the slide. For instance, a vertically oriented slide can be performed from high to low and has therefore a direction referred to as DOWN; inversely, the vertically oriented slide can be performed from low to high and has therefore a direction referred to as UP. As another example, a horizontally oriented slide can have a left to the right direction and has therefore a direction referred to as RIGHT; inversely, the horizontally oriented slide can be performed from the right to the left and has therefore a direction referred to as LEFT. Therefore, the vertical orientation can be directed UP or DOWN, and the horizontal orientation can be directed RIGHT or LEFT.

The distance of the slide (between the first and second locations of the slide) allows modifying the value of the parameter. In practice, the value belongs to a range of values. Each value of the range can be associated with the parameter, being understood that one value at a time is associated with the parameter. The range of values may form a set of continuous values, as opposed to discrete values. The term value is synonym of data. The range of values can be finite or infinite.

The modification of the value of the parameter is performed as known in the art. The increase or the decrease of the parameter value can be proportional to the distance of the displacement of the second user interaction from a first location to a second location. The distance may be a Euclidian distance, a number of pixels.

The increase or the decrease of the parameter value may depend on the direction of the slide. For instance, an UP slide (a slide with a vertical orientation and a low to the high direction) may increase the value of the opacity, while the DOWN slide (a slide with a vertical orientation and a high to the low direction) may decrease it. As another example, the LEFT slide (a slide with a horizontal orientation and a right to the left direction) may decrease the value of the brightness of the first color, while the RIGHT slide (a slide with a horizontal orientation and a left to the right direction) may increase it.

Thus, when the second user interaction is performed (which means while the contact between the touch sensitive display and the appendage is detected), the parameter value can be modified. And the new parameter value is set when the second user interaction is no more detected, e.g. the contact between the touch sensitive display and the appendage is no more detected.

Figure 6:
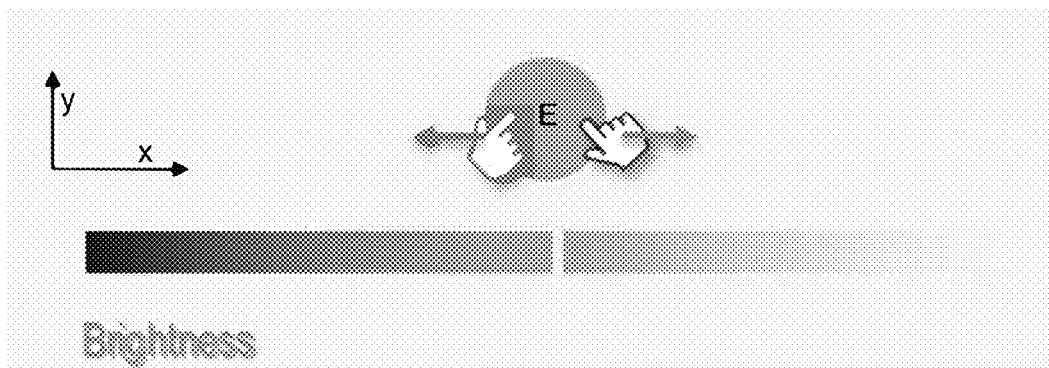

FIG. 6 shows an example of a second user interaction that is performed after the selection of the color of the icon E that is illustrated on FIG. 5. The second user interaction starts with a contact performed on the icon E, for instance, the user uses one of their finger. The contact may be a touch, that is, the duration of the contact is equal to or exceeds a predetermined time period. The location of this touch is thus the first location from which the slide starts. Then, the user horizontally slides their finger to the right for increasing the brightness of the color formerly selected (a RIGHT slide), or on the contrary they can move their finger to the left in order to decrease the brightness (a LEFT slide). The movement of slide is substantially parallel to the axis x: the slide is substantially horizontal. Substantially means that the angle between the axis x and the orientation of the slide does not exceed a predetermined angle, e.g. this angle is comprised between −45 and +45 degrees.

Figure 7:
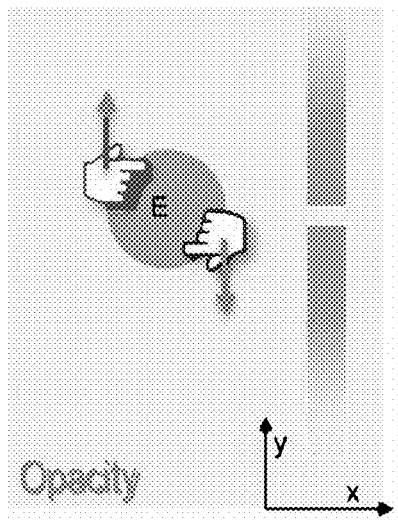

FIG. 7 shows another example of second user interaction that is also performed after the selection of the color of the icon E. The second user interaction starts from a touch performed on the icon E that is illustrated on FIG. 5. Then, the user can vertically slide their finger up for increasing the opacity of the color associated with the icon E; an UP slide is done. Or the user can vertically move down their finger in order to decrease the opacity; a DOWN slide is done. The movement of slide is substantially parallel to the axis y: the slide is substantially vertical. Substantially means that the angle between the axis y and the direction of the slide does not exceed a predetermined angle, e.g. this angle is comprised between −45 and +45 degrees.

Figure 8:
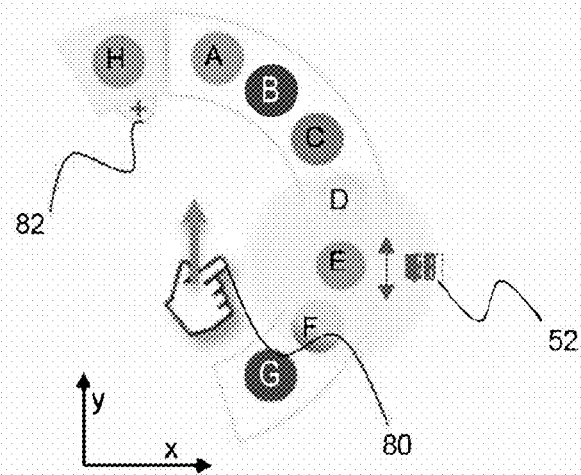

FIG. 8 shows another illustration of the example of FIG. 7. The user moves up their finger for increasing the opacity of the color associated with the icon E. Interestingly, only the visual indicator 52 is now displayed for indicating the user that the opacity is currently modified. In the example of FIG. 8, the first location 80 of the second user interaction is not performed on the icon E or one the zone of the icon E. Indeed, after the selection of a color (step S114, S116), the system knows that the next user interaction will concern the selected color, unless another user interaction is performed on another icon, as it will be discussed in reference to FIG. 2. Therefore, the second user interaction can be executed outside the zone of the icon, but it will concern the color associated with the icon; this allows performing a second user interaction after the detection of the end of the first user interaction.

Back to FIG. 1, at step S130, a new color is computed in real-time from the first color on which the modified parameter value is applied: the former parameter value is thus replaced by the new parameter value. Computing in real-time means that the new color is computed as soon as a new value of the parameter is obtained upon the second user interaction. Hence, the term real-time does not refer to a guaranty of providing a response within available parameter value of this color, but rather to the ability to display a computed result when information required for computing the result is available to the system.

The first icon may be re-rendered with the computed new color (S132); the re-rendering is preferably performed in real-time, that is, each time a new color is computed. The user benefits therefore of a visual feedback of the current parameter value.

Alternatively, the display of the new color may be performed with another icon of the set. This icon is preferably an icon dedicated to the record of a new color obtained with the present method: this icon is associated with a user-defined color. For instance, the icon H on FIG. 8 displays the new color (step S132), and the original rendering of the first icon is not modified (the icon E is still rendered in green).

When the second user interaction ends, the last computed new color is recorded, for instance upon user action by clicking on the add button 82 of FIG. 8. This allows reusing the generated color at a later stage. The recorded new color can be applied on an object, e.g. on the selected object of step S100, or on another object. Applying the new color means that at least a part of the object is re-rendered with this new color.

Referring now to FIG. 2, it is discussed a second example of the invention in which the generated color is obtained from the merge of two colors. One of these two colors can be obtained by performing the method discussed in reference of FIG. 1.

At step S140, a third user interaction is detected on a second icon of the set, e.g. the third user interaction is a touch. The step S140 is similar to the step S110. The second icon may be the same or not than the first one of step S110. The third user interaction is performed while the second user interaction is still detected. The system thus knows that a merge of color is going to be carried out.

In the event the user ends the second user interaction before the third one is carried out, they can select a color by performing a touch on one of the icons of the set as explained in reference to steps S110 to S116. The user can also recall the color recorded at step S134, e.g. they perform a touch on the icon 80 that is associated with a user-defined color. In both cases, a user interaction is still detected in addition to the third one.

In the event the user performed only a selection of the first color, that is, without performing steps S120 to S134, the step S140 is performed before detecting the end of the first user interaction (S114). By this way, the system knows that a new color will be computed by merging the first color and a second color (modified or not).

Then, at step S142, one determines that the third user interaction exceeds a predetermined time period t2. The step S142 is similar to the step S112. The time period t2 may be equal, smaller or larger than t1. In practice, t1 and t2 have a same value so that there is no difference for the user between the first and third user interactions.

Figure 9:
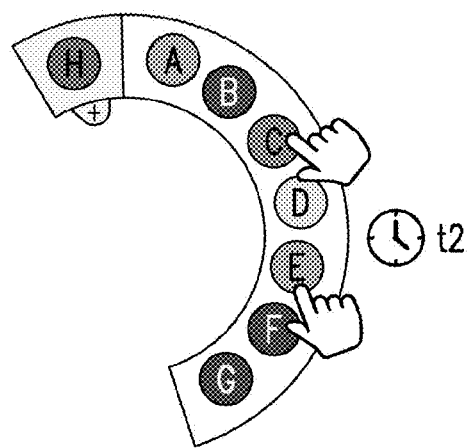

FIG. 9 illustrates an example of step S142: the user touches with their finger the icon C associated with the color orange while the user touch on the icon E is maintained.

Next, at step S144, the end of the third user interaction is detected. The step S144 is similar to the step S114.

Then, at step S146, a second color that is associated with the second icon is selected. This is done the same way as discussed for step S116.

At this step of the method, a new color may be computed by merging the first new color computed at step S130 with the second color that is associated with the selected second icon of step S146. In this case, the computed new color is the merge of a modified color and an unmodified color that are selected upon user interactions.

Alternatively, and still at this step of the method, the new color may be computed by merging the first color that is associated with the selected first icon at step S116 with the second color that is associated with the selected second icon of step S146. In this case, the computed new color is the merge of two unmodified colors selected upon user interactions. This computed new color can be displayed as discussed in reference to steps S130-S134.

Figure 10:
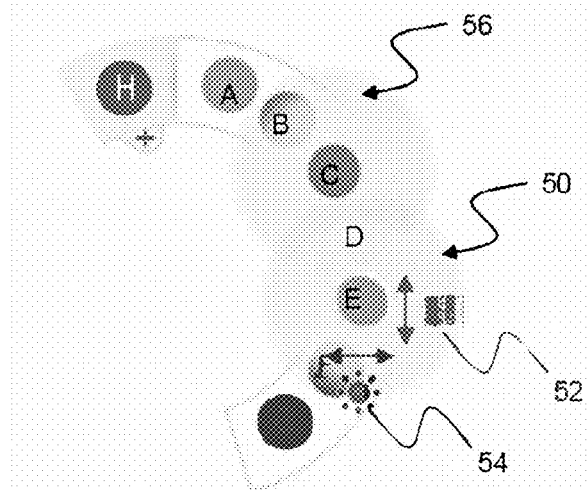
Figure 11A:
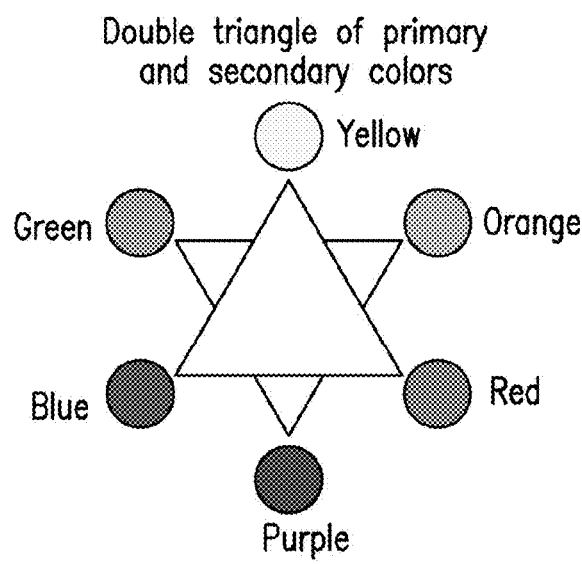
FIGS. 11a, 11b, 11c and 11d show examples color wheels.
Figure 11B:
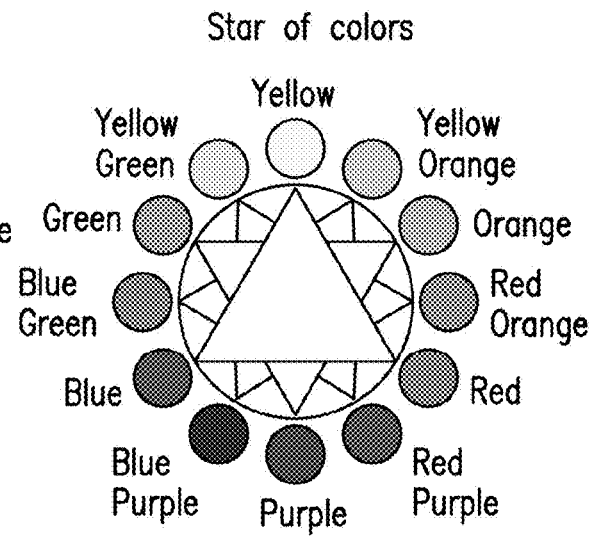
Figure 11C:
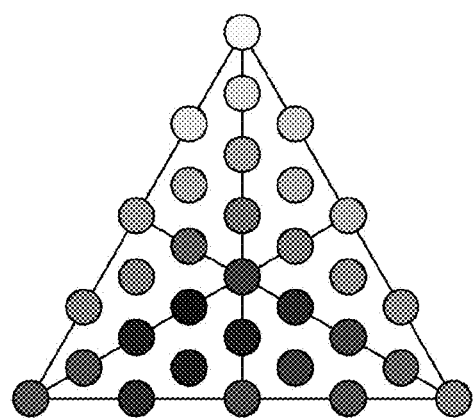
Figure 11D:
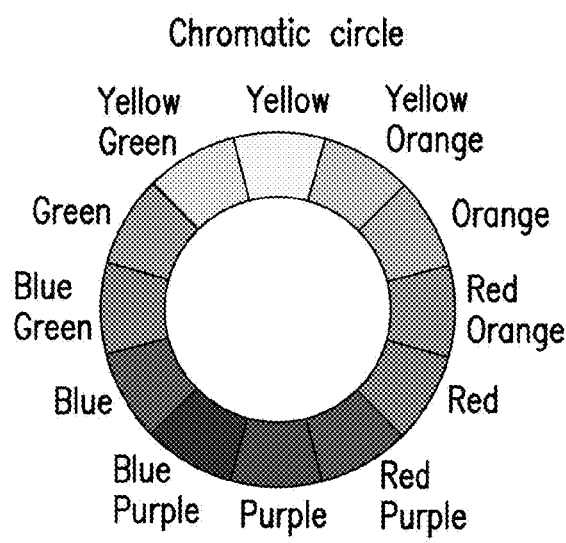

FIG. 10 shows the situation in which two colors have been selected. Both icons E and C are surrounded by blurred zones for providing a visual indication of the selection of the color green and color orange associated with the icons E and C. Still in reference to FIG. 10, two new indicators 52, 54 are also displayed together with the blurred zone 50. In this example, the indicators are displayed in the close neighborhood of the icon D and they are represented over the blurred zone 50. In another example, the two new representations 52, 54 might be represented over the blurred zone 56 of the last selected icon C.

Now that the second color is selected, the user may release the first or the second user interaction, depending on whether the user has or not modified at least one parameter value of the selected first color. The system knows that a new color will be computed by merging the first color (modified or not) and the second color (modified or not). In the event the user releases the first or the second user interaction (for instance they removes their finger of the touch sensitive display so that there is no more contact), the second color can be modified only with the fourth user interaction of the example of the steps S150, S152, S154, S160. These fourth steps are similar to the steps S120, S122, S124, S130, except that the slide in this example is substantially vertical and that the parameter value tuned by the user is the opacity of the second color.

In the event the user does not release the first or the second user interaction, the selected second color can be modified by using both the first and the fourth user interactions or the second and fourth user interactions. Interestingly, the user can simultaneously modify values of two parameters of the selected second color, e.g. by sliding their two fingers.

Then, at step S162, a second icon of the set (the one selected at step S140-S146) is re-rendered in real-time with the second new color computed at step S160. The re-rendering of step S162 is similar to the one described in reference to step S132. In practice, the step S162 is not carried out as the user does not need to see the modification of the color of the second icon, but rather the third new color obtained as a result of steps S170 to S180.

At step S170, a third new color is computed by merging the first new color computed at step S130 with the second new color computed at step S160. The merge of two colors is performed as known in the art: merging two color is also referred to as color mixing. Color merging (or color mixing) can be done, for example, by performing an additive mixing of colors or a subtractive mixing of colors.

The third new color is preferably rendered on an icon dedicated to the record of a new color obtained with the present method. Hence, this icon is associated with a user-defined color. In FIG. 10, the icon H is associated with the third new color and is rendered in real-time with this third new color (S172).

Then, at step S180, the end of the user interactions is detected; this triggers the recording of the third new color. The recording can also be carried out upon user action by clicking on the add button 82.

Next, at step S182, a fifth user interaction is detected, and the third new color is applied on the select object. The fifth user action may be performed on the icon H that is associated with the third new color.

In the examples of the flowcharts of FIGS. 1 and 2, the selected color are those associated with the set of icons. It is to be understood that a color obtained and recorded can be used for generating a new color. The recorded color is associated with an icon used for displaying user-made colors, for instance with the icon H discussed in reference with FIGS. 8 and 10.

FIGS. 11a to 11d show examples of colors wheels, as known in the art. The color wheels depict relationships between colors, and can be used for computing a merge of primary, secondary, tertiary colors. These primary, secondary, tertiary colors may be associated with the icons of the set.

Figure 12:
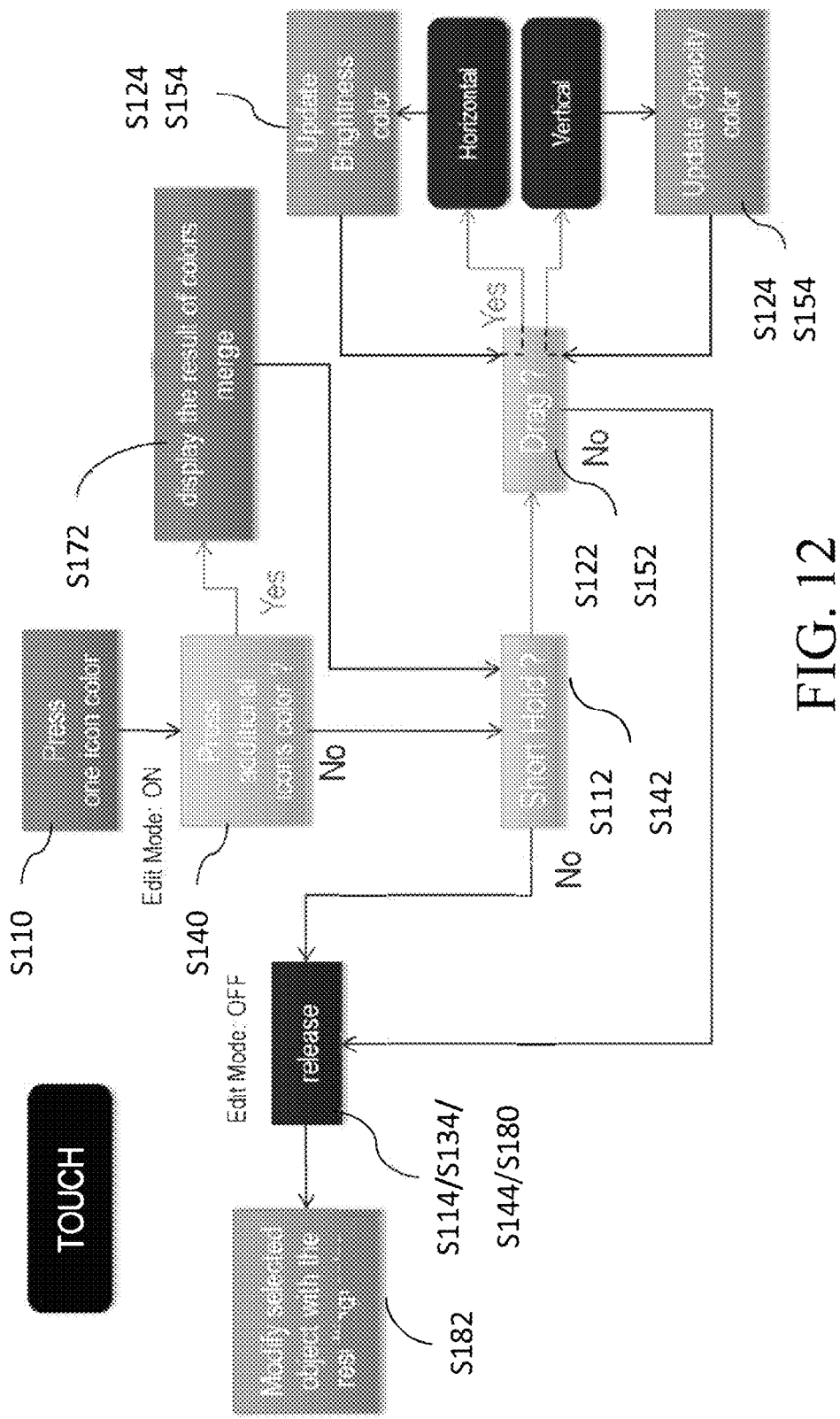
FIG. 12 shows a flowchart of examples of user inputs.

FIG. 12 is a flowchart that shows the different examples and alternatives discussed in relation with FIGS. 1 and 2. As it is apparent on FIG. 12, many combinations of user interactions can be performed. FIG. 15 shows examples of different combinations of user interactions (UI).

The examples of the invention have been discussed with user interactions performed on a touch-sensitive display. It is to be understood that the present invention can be performed with user-interaction that are not necessarily done with a contact between an appendage and a touch sensitive display. For instance, a user interaction can be detected when the appendage is close to the display, or even simulated in a context of virtual environment.

The invention claimed is:

1. A computer-implemented method for generating a color of an object displayed on a graphical user interface, comprising:
displaying, on the graphical user interface, a set of icons, each icon of the set being associated with a color;
detecting a first user interaction on a first icon of the set;
detecting a second user interaction that comprises at least a slide;
modifying a value of a parameter of a first color associated with the first icon, the modification of the value being performed with the second user interaction;
computing a first new color that is the first color with the modified value of a parameter
detecting a third user interaction on a second icon of the set associated with a second color, the third user interaction being a touch on the second icon; and
upon detecting an end of the touch on the second icon, automatically by a computer system and without user interaction, computing a second new color by merging the first new color and the second color.

2. The computer-implemented method of claim 1, further comprising, before computing the second new color:
detecting a fourth user interaction that comprises at least a slide; and
modifying a value of a parameter of the second color, the selection of the value is performed with the fourth user interaction.

3. The computer-implemented method of claim 1, wherein the second user interaction comprises a touch and a slide that starts from the touch, the slide having an orientation that is substantially horizontal.

4. The computer-implemented method of claim 1, wherein the second user interaction comprises a touch and a slide starting from the touch, the slide having an orientation that is substantially vertical.

5. The computer-implemented method of claim 3, wherein one orientation of the slide is associated with one parameter of the first color.

6. The computer-implemented method of claim 4, wherein one orientation of the slide is associated with one parameter of the first color.

7. The computer-implemented method of claim 1, wherein detecting a first user interaction on a first icon of the set further comprises:
detecting a first user touch on a first icon of the set;
determining that the duration of first user touch exceeds a predetermined time period;
detecting that the first user touch is ended; and
selecting the first color associated with the first icon when the end of the first user touch is detected.

8. The computer-implemented method of claim 2, further comprising:
selecting an object displayed on the graphical user interface before displaying the set of icons;
detecting a fifth user interaction after the first or second new color has been computed;
applying the first or second new color on the select object;
detecting a third user interaction on a second icon of the set associated with a second color; and
computing a second new color by merging the first new color and the second color.

9. The computer-implemented method of claim 1, wherein the computing the first new color is performed in real-time while the second user interaction is detected, and wherein the method further comprises:
rendering the first icon of the set with the computed first new color computed in real-time.

10. The computer-implemented method claim 1, further comprising:
rendering a third icon with the computed first or second new color.

11. A non-transitory computer readable storage medium having recorded thereon a computer program comprising instructions for performing a method for generating a color of an object displayed on a graphical user interface, the method comprising:
displaying, on the graphical user interface, a set of icons, each icon of the set being associated with a color;
detecting a first user interaction on a first icon of the set;
detecting a second user interaction that comprises at least a slide;
modifying a value of a parameter of a first color associated with the first icon, the modification of the value being performed with the second user interaction;
computing a first new color that is the first color with the modified value of a parameter
detecting a third user interaction on a second icon of the set associated with a second color, the third user interaction being a touch on the second icon; and
upon detecting an end of the touch on the second icon, automatically by a computer system and without user interaction, computing a second new color by merging the first new color and the second color.

12. The non-transitory computer readable storage medium of claim 11, wherein the method further comprises, before computing the second new color:
detecting a fourth user interaction that comprises at least a slide; and
modifying a value of a parameter of the second color, the selection of the value is performed with the fourth user interaction.

13. The non-transitory computer readable storage medium of claim 11, wherein the second user interaction comprises a touch and a slide that starts from the touch, the slide having an orientation that is substantially horizontal.

14. The non-transitory computer readable storage medium of claim 11, wherein the second user interaction comprises a touch and a slide starting from the touch, the slide having an orientation that is substantially vertical.

15. The non-transitory computer readable storage medium of claim 14, wherein one orientation of the slide is associated with one parameter of the first color.

16. A system comprising:
processing circuitry coupled to a memory and a graphical user interface, the memory having recorded thereon a computer program comprising instructions for generating a color of an object displayed on a graphical user interface that when executed by the processing circuitry causes the processing circuitry to be configured to:
display, on the graphical user interface, a set of icons, each icon of the set being associated with a color,
detect a first user interaction on a first icon of the set,
detect a second user interaction that comprises at least a slide,
modify a value of a parameter of a first color associated with the first icon, the modification of the value being performed with the second user interaction,
compute a first new color that is the first color with the modified value of a parameter
detect a third user interaction on a second icon of the set associated with a second color, the third user interaction being a touch on the second icon, and upon detecting an end of the touch on the second icon, automatically by the system and without user interaction, compute a second new color by merging the first new color and the second color.

17. The system of claim 16, wherein the processing circuitry is further configured to, before computing the second new color:
   detect a fourth user interaction that comprises at least a slide, and
   modify a value of a parameter of the second color, the selection of the value is performed with the fourth user interaction.

18. The system of claim 16, wherein the second user interaction comprises a touch and a slide that starts from the touch, the slide having an orientation that is substantially horizontal.

19. The system of claim 16, wherein the second user interaction comprises a touch and a slide starting from the touch, the slide having an orientation that is substantially vertical.

20. The system of claim 19, wherein one orientation of the slide is associated with one parameter of the first color.

* * * * *